(12) United States Patent
Ferrara et al.

(10) Patent No.: US 9,179,514 B2
(45) Date of Patent: Nov. 3, 2015

(54) CONTROL CIRCUIT FOR REDUCING OF TOTAL HARMONIC DISTORTION (THD) IN THE POWER SUPPLY TO AN ELECTRIC LOAD

(75) Inventors: Antonio Ferrara, San Benedetto Val di Sambro (IT); Fabrizio Tozzo, Osimo (IT)

(73) Assignee: Roal Electronics S.P.A., Castelfidardo (AN) (IT)

( * ) Notice: Subject to any disclaimer, the term of this patent is extended or adjusted under 35 U.S.C. 154(b) by 0 days.

(21) Appl. No.: 14/414,058

(22) PCT Filed: Jul. 11, 2012

(86) PCT No.: PCT/IB2012/053549
§ 371 (c)(1),
(2), (4) Date: Jan. 9, 2015

(87) PCT Pub. No.: WO2014/009773
PCT Pub. Date: Jan. 16, 2014

(65) Prior Publication Data
US 2015/0216007 A1    Jul. 30, 2015

(51) Int. Cl.
*H02M 3/156*    (2006.01)
*H05B 33/08*    (2006.01)
*G05F 1/40*    (2006.01)

(52) U.S. Cl.
CPC ........ *H05B 33/0845* (2013.01); *H05B 33/0809* (2013.01); *H05B 33/0896* (2013.01)

(58) Field of Classification Search
CPC .............. H02M 3/157; H02M 1/4225; H02M 2001/0012; H02M 2001/0022; H02M 2001/0025; H02M 2001/007; H02M 2003/1586; H02M 2005/2937; H02M 5/2576; G05F 1/452; H05B 33/0812; H05B 33/0818; H05B 33/0845

See application file for complete search history.

(56) References Cited

U.S. PATENT DOCUMENTS

| 4,449,091 A | * | 5/1984 | Otoi | 323/236 |
| 5,459,375 A | * | 10/1995 | Nilssen | 315/247 |
| 5,872,429 A | * | 2/1999 | Xia et al. | 315/194 |

(Continued)

FOREIGN PATENT DOCUMENTS

WO    2006/102355 A2    9/2006

OTHER PUBLICATIONS

International Search Report dated Mar. 19, 2013, issued in PCT Application No. PCT/IB2012/053549, filed Jul. 11, 2012.

*Primary Examiner* — Crystal L Hammond
(74) *Attorney, Agent, or Firm* — Workman Nydegger (57) ABSTRACT

A control circuit for reducing Total Harmonic Distortion (THD) in the power supply to an electric load, includes an input stage (10) for receiving a network voltage (V1) and providing a corresponding rectified sinusoidal output supply voltage (Vbus); an output stage (20) associated with the input stage (10) for providing power supply to an electric load (L); a control module (30) designed to control the power factor and the harmonic distortion (THD) of the energy obtained from the network voltage (V1), by regulating a pulse current (S1) that acts upon the power supply absorbed by the output stage (20); a regulating module (40) which is designed to: sense a main signal (SW) representative of the supply voltage (Vbus); compare the main signal (SW) with a preset reference (Vref); generate a regulating signal (S3) designed for the control module (30). The control module (30) is designed to modify the pulse current (S1) according to the regulating signal (S3).

6 Claims, 7 Drawing Sheets

(56) References Cited

U.S. PATENT DOCUMENTS

| | | | |
|---|---|---|---|
| 5,912,549 A * | 6/1999 | Farrington et al. | 323/207 |
| 5,932,938 A * | 8/1999 | Shimamori | 307/125 |
| 6,037,722 A * | 3/2000 | Moisin | 315/307 |
| 6,037,757 A * | 3/2000 | Oliveira et al. | 323/241 |
| 6,069,457 A * | 5/2000 | Bogdan | 315/291 |
| 6,577,075 B2 * | 6/2003 | Romano et al. | 315/276 |
| 6,906,474 B2 * | 6/2005 | Trestman et al. | 315/224 |
| 6,917,185 B2 * | 7/2005 | Okamoto | 323/241 |
| 7,378,805 B2 * | 5/2008 | Oh et al. | 315/291 |
| 7,919,958 B2 * | 4/2011 | Oettinger et al. | 323/283 |
| 8,471,488 B1 * | 6/2013 | Hopkins et al. | 315/247 |
| 8,698,407 B1 * | 4/2014 | Chen et al. | 315/193 |
| 2004/0178784 A1 | 9/2004 | Okamoto | |
| 2006/0232220 A1 * | 10/2006 | Melis | 315/209 R |
| 2013/0278145 A1 * | 10/2013 | Lin et al. | 315/122 |

* cited by examiner

CONTROL CIRCUIT FOR REDUCING OF TOTAL HARMONIC DISTORTION (THD) IN THE POWER SUPPLY TO AN ELECTRIC LOAD

BACKGROUND OF THE INVENTION

1. Field of the Invention

The present invention relates to a control circuit for reducing Total Harmonic Distortion (THD) in the power supply to an electric load.

2. Present State of the Art

In civil and industrial lighting applications, use is known to have been increasingly made of solid state devices, such as LEDs, which require electronic power supplies for proper operation. These power supplies allow galvanic isolation of the light source from the electric network and can supply controlled current to the light source. A number of parameters are used to describe the electric performances of these power supplies, including conversion efficiency, the power factor (PF) on the electric network and the Total Harmonic Distortion (THD) of the current drawn from the electric network.

The Total Harmonic Distortion THD of a signal is the ratio of the sum of the powers of all the harmonics above the fundamental, and the power of the fundamental. The energy transfer efficiency increases as the power factor on the electric network (and hence the electric load systems) becomes closer to one, and the Total Harmonic Distortion on the mains becomes closer to zero.

For instance, in the ideal case of a purely resistive load, supplied with purely sinusoidal AC voltage, there will be a maximum energy transfer efficiency, with a power factor one, and a zero harmonic distortion of the absorbed current.

The electric energy required for lighting is a relevant part of the total electric energy production. Therefore, in electronic power supplies, all the solutions that can improve the power factor and decrease the harmonic distortion in the current drawn therefrom are very important for energy transfer purposes. Hence, the need is increasingly felt of increasing the power factor and decreasing the harmonic distortion of the current drawn from the electric network.

At present, electronic power supplies which are known and recently produced mainly use switching techniques for energy conversion. Such techniques afford high conversion densities and low costs. One or more conversion blocks are usually provided, each optimized for a particular task.

Figure 1:
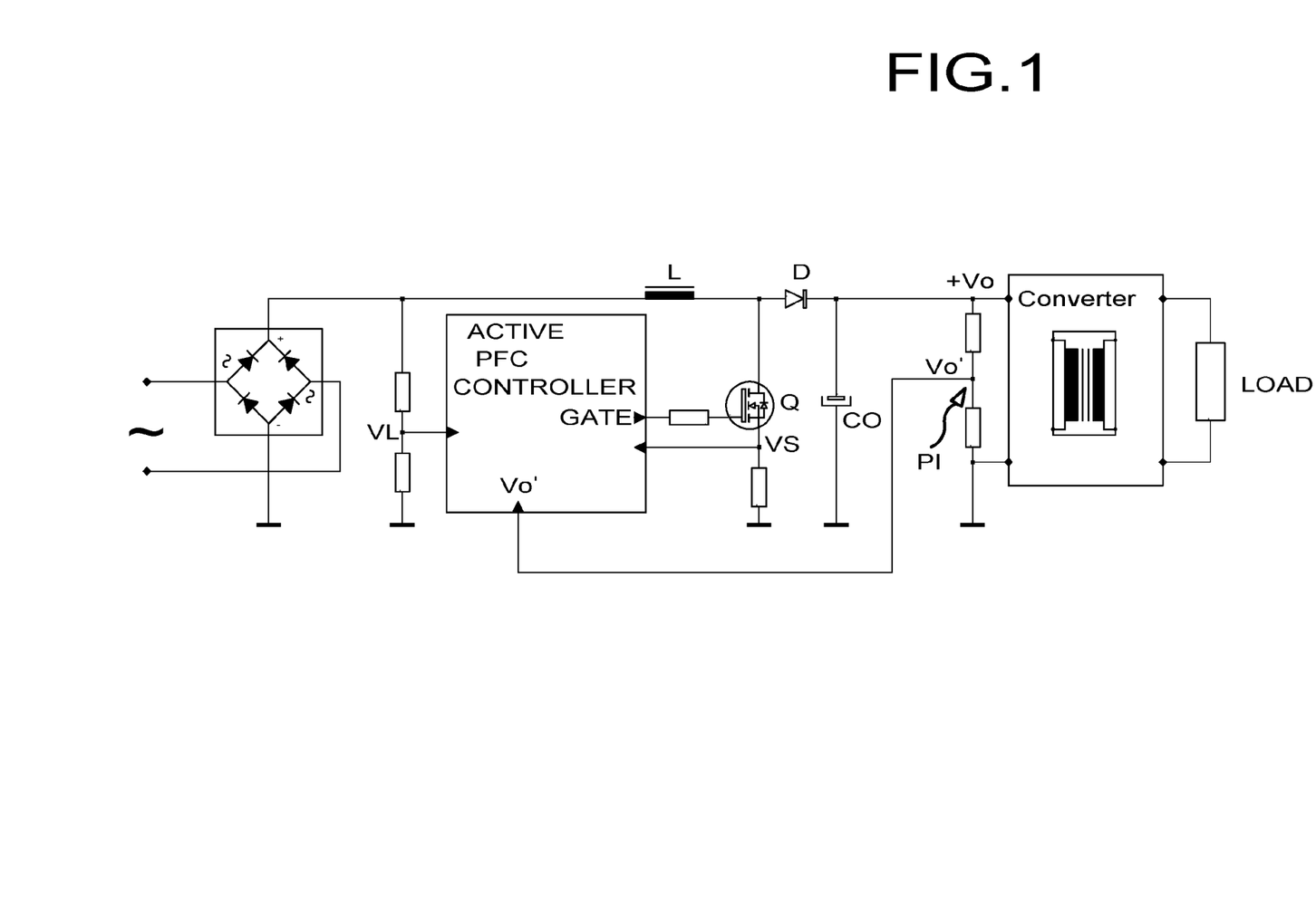
FIG. 1 is a schematic view of a known circuit.

FIG. 1 schematically shows a prior art power supply, in which the network voltage is initially rectified by the diode bridge; then the Power Factor Controller (PFC) allows control of the power factor, reduction of THD, as well as optimization of energy transfer efficiency. Finally, power is supplied to the load (LOAD) through the bulk capacitor (CO) and the converter connected thereto.

A number of active circuits known as "Power Factor Circuits", which are designed to improve the power factor, are available. The prior art usually includes buck, boost, buck/boost and flyback topologies for this conversion stage.

Figure 2:
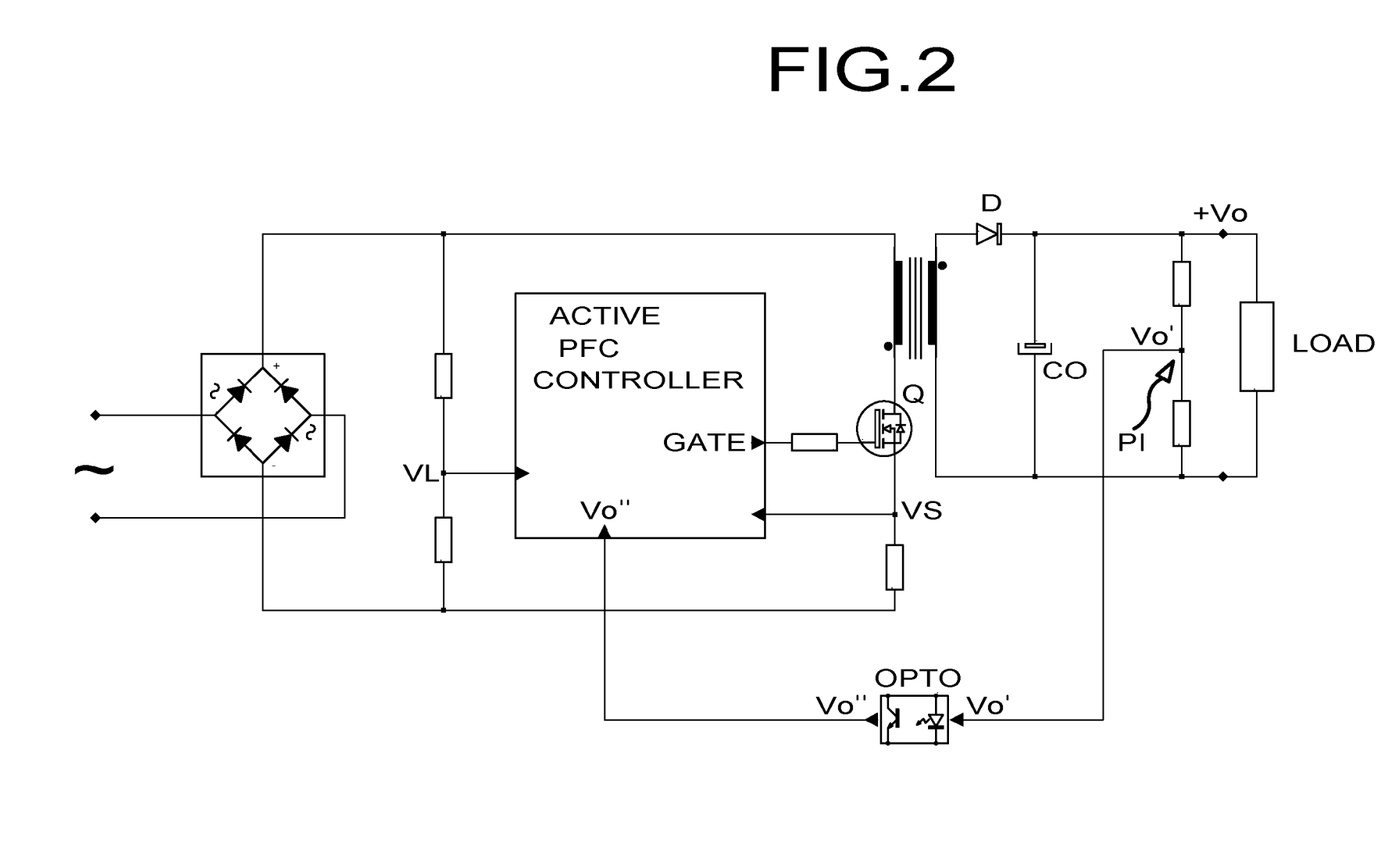
FIG. 2 shows a variant of the circuit of FIG. 1.

The most common circuits for low-power applications (which are typical for LED lighting applications) are the one as shown in FIG. 1 (Transition Mode Boost PWM circuits— fixed ON time, variable frequency) and its insulated derivative, as shown in FIG. 2 (bulkless flyback circuits).

Active circuits draw a sinusoidal current in phase with the voltage from the mains, and load a capacitor to a predetermined voltage through a switching circuit controlled by an integrated PFC controller. In order to accomplish this task, the circuits designed for this type of application use information proportional to the mains voltage (e.g.,. VL in FIGS. 1, 2) and the voltage proportional to the current in the switching circuit (VS in FIGS. 1, 2). If the "Power Factor Circuit" operates with a predetermined input voltage within a restricted range, the VL and VS signals may be optimized to obtain optimal PF (Power Factor) and TDH (Total Harmonic Distortion) values.

If the "Power Factor Circuit" operates over a wide input voltage range, e.g., 90 VAC-305 VAC, the VL and VS signals are not easily optimized throughout the input voltage range. The power factor and the total harmonic distortion are strongly affected by this phenomenon, whereby no satisfactory result can be obtained (in terms of power factor maximization and total harmonic distortion minimization) over the entire range of possible input voltages.

This adds operational restrictions in prior art circuits because, in response to considerable supply voltage changes, they cannot ensure optimal power supply to the load.

SUMMARY OF THE INVENTION

Therefore, the object of the present invention is to provide a control circuit that can maintain a high power factor value and a low total harmonic distortion value, over a wide range of possible input supply voltages.

This and other objects are substantially fulfilled by a control circuit for reducing Total Harmonic Distortion in the power supply to an electric load as defined in the annexed claims.

BRIEF DESCRIPTION OF THE DRAWINGS

Further features and advantages will appear more clearly from a detailed description of a preferred, non-limiting embodiment of the invention.

Such description is provided below with reference to the accompanying figures, which are also provided by way of example and without limitation, in which.

DETAILED DESCRIPTION OF THE PREFERRED EMBODIMENTS

Referring to the accompanying figures, numeral 1 generally designates a control circuit for reducing Total Harmonic Distortion (THD) in the power supply to an electric load according to the present invention.

The circuit 1 (FIG. 4) is designed to be interposed between a power source, e.g., an electric network, and an electric load L.

Preferably, the electric load L is a lighting device, particularly a LED device. Nevertheless, it shall be noted that the circuit of the invention may be also advantageously used with other types of lighting devices, (e.g., OLED) and, in principle, also with other types of electric devices that do not have to be lighting devices.

As more clearly shown below, the circuit 1 of the invention affords adequately high Power Factor (PF) values and adequately low Total Harmonic Distortion (THD) values, even when it is connected to supply networks which are significantly different from each other.

The circuit 1 (FIG. 4) comprises an input stage 10 for receiving a network voltage V1.

Figure 4:
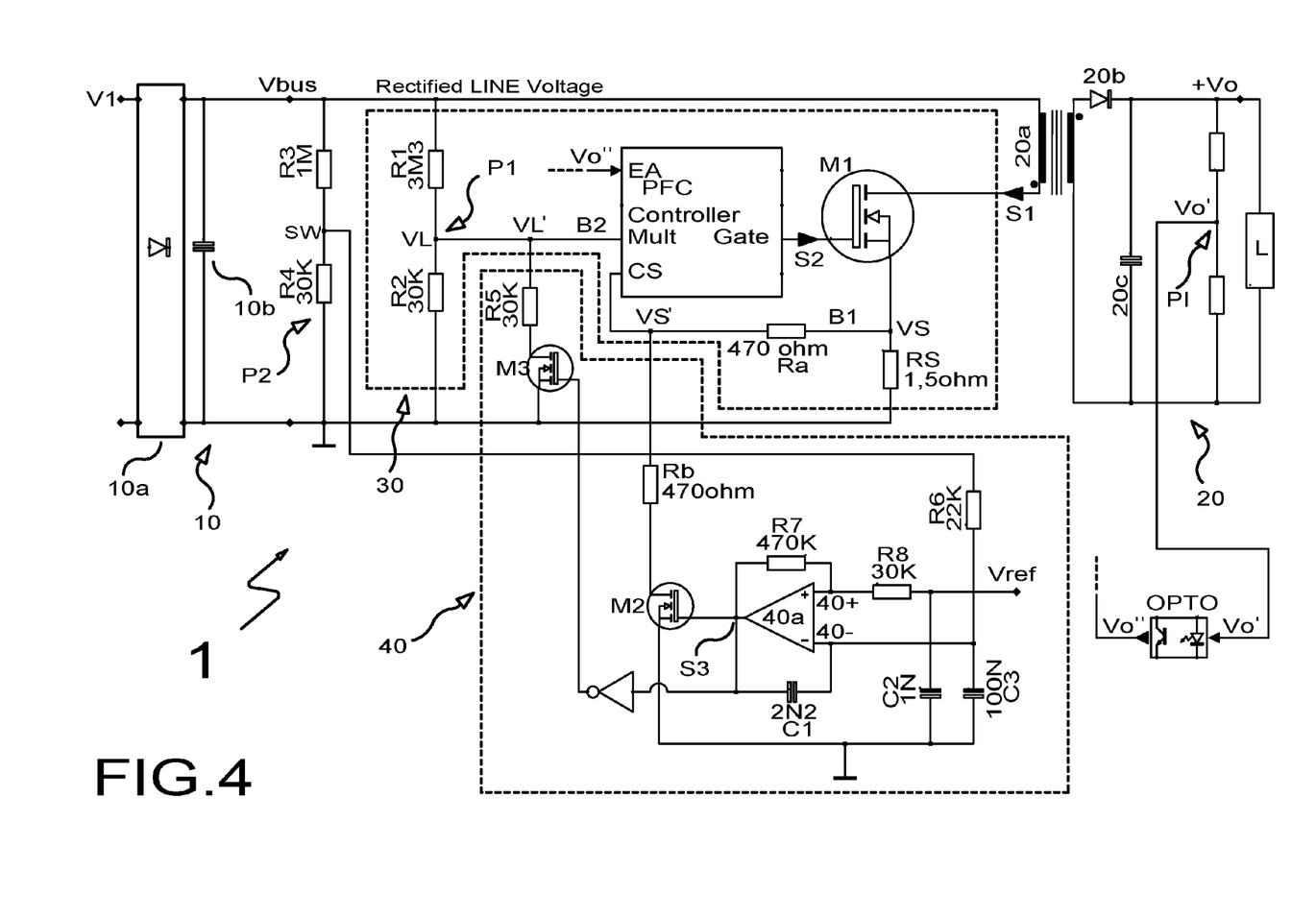
FIG. 4 shows a further detail of the circuit of FIG. 3, according to the present invention.

The network voltage V1 may come from a network or a power supply system. The network voltage V1 is preferably a substantially sinusoidal voltage having preset amplitude and frequency. For example, the network voltage V1 may range from about 100 V at 50/60 Hz (Japan) to about 277 V at 60 Hz (United States).

Preferably, the input stage 10 comprises a rectifier module 10a, which comprises, for instance a diode bridge.

Preferably, the input stage 10 also comprises a filter module 10b.

Once the input stage 10 has appropriately processed the network voltage V1, it provides a rectified sinusoidal output supply voltage Vbus.

The circuit 1 also comprises an output stage 20 which supplies power to the load L from the supply voltage Vbus.

Preferably, the output stage 20 comprises an inductive element 20a, which (based on a control of the high frequency switch M1) is designed to store and release the current obtained by the above mentioned supply voltage Vbus.

Preferably, the output stage 20 further comprises a diode 20b and a capacitor 20c, as schematically shown in FIG. 4.

The circuit 1 further comprises a control module 30 for controlling the power factor of the energy drawn from the supply network V1. For this purpose, the control module 30 is designed to absorb an appropriate pulse current S1 through the actuation of the switch M1.

Preferably, the control module 30 comprises a processing unit PFC, which is designed to receive at its input an input signal VL, representative of the supply voltage Vbus, and a current sense signal VS representative of the pulse current S1.

Preferably, the input signal VL may be obtained from the supply voltage Vbus, through a first divider P1.

Particularly, the first divider P1 may include first and second resistors R1, R2 located between the Vbus and the ground. The input signal VL may be drawn at a node interposed between the above mentioned first and second resistors R1, R2.

By way of example, the first resistor R1 may be of about 3 MΩ, and the second resistor R2 may be of about 30 KΩ. Therefore, since the supply voltage Vbus may be as high as 200-400 V, the value of the input signal VL will be about 2-4 V.

Preferably, the current sense signal VS may be drawn from the ends of a sensing resistor RS, through which the above mentioned pulse current S1 flows.

More in detail, the control module 30 comprises a switching device M1, associated with the processing unit PFC. The above mentioned pulse current S1 is generated by the switching device M1.

By way of example, the switching device M1 may be formed as a transistor, e.g., of the MOSFET type.

Preferably, the sensing resistor RS is connected to a terminal of the switching device M1 so that, as mentioned above, the pulse current S1 may flow through the sensing resistor RS.

In one embodiment, the sensing resistor RS has a first terminal connected to the ground, and a second terminal connected to the switching device M1. The current sense signal VS may be drawn at such second terminal.

The processing unit PFC is designed to control the pulse current S1 according to the input signal VL and the current sense signal VS.

Particularly, for this purpose, the processing unit PFC sends a PWM control signal S2 to the switching device M1, which signal is generated according to the input signal VL and the current sense signal VS.

In practice, the processing unit PFC ensures that the waveform of the current drawn from the electric network is as close as possible to a sine waveform, and in phase with the network voltage, thereby maximizing its power factor and minimizing the occurrence of undesired harmonics.

Figure 5:
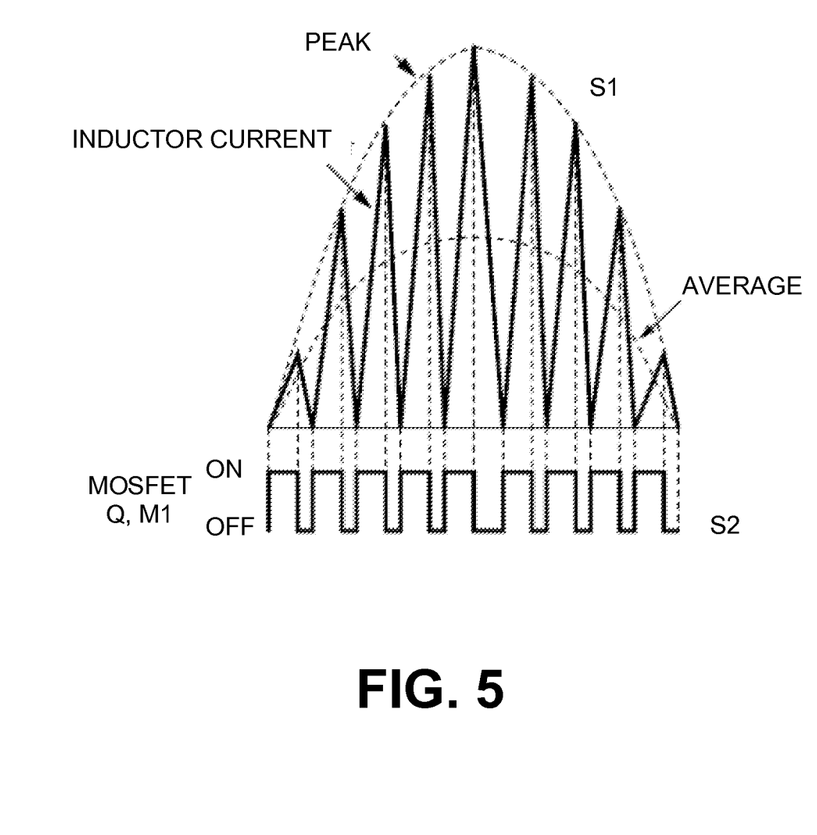
FIG. 5 shows the curves of some electric quantities in the circuit of FIGS. 3-4.

Under optimal operating conditions, the result of the activity of the processing unit PFC is shown in schematic form in FIG. 5. The square wave at the bottom of the graph is the driving signal for the switching device M1, i.e., the control signal S2; the resulting current peaks have an envelope and a mean value as shown by the broken lines. If, as shown in FIG. 5, the circuit operates under optimal conditions, i.e., with all the components appropriately dimensioned for the network voltage V1 and the resulting supply voltage Vbus, then the envelope defined by the above mentioned peaks has a substantially sinusoidal form. Thus the profile of the supply voltage Vbus is followed, thereby maximizing the power factor and minimizing the undesired harmonics.

It shall be noted that, for better readability, the diagram is not shown with the quantities in real proportions. The driving signal of the switching element M1 has a frequency of the order of 100 KHz, whereas the envelope curve is typically at 50-60 Hz. Therefore, the frequency of the illustrated driving signal has been intentionally reduced, to show a very small number of peaks and allow qualitative appreciation of the phenomenon.

Should the circuit operate under less advantageous conditions (namely in terms of dimensioning of its components, such as the value of the sensing resistor RS), the driving signal of the switching element M1 would be less accurate, and generate a curve other than the desired sine waveform for the envelope of current peaks and, as a result, the power factor would be significantly reduced and undesired harmonics would occur.

In order to prevent this drawback, the circuit 1 comprises a regulating module 40. The regulating module 40 is associated with the control module 30, to allow the latter to fit various network voltages V1, involving various supply voltages Vbus. The regulating module 40 is designed to detect a main signal SW representative of the supply voltage Vbus.

In one embodiment (not shown), the main signal SW may substantially coincide with the input signal VL, and may be sensed through the above mentioned first divider P1.

In a different embodiment, as schematically shown in FIG. 4, the main signal SW may be sensed by a second divider P2.

Preferably, the second divider P2 is different from the first divider P1: the second divider P2 is preferably also located between the supply voltage Vbus and the ground, and has a division ratio different than that of the first divider P1. Thus, the same information concerning the supply voltage Vbus may be provided at two different levels, appropriately defined and optimized, to the processing unit PFC and the regulating module 40.

Further advantages derived from the use of two distinct dividers P1, P2 consist in the possibility of uncoupling the circuit portion that provides the input to the processing unit PFC from the circuit portion that provides the input to the regulating module 40, as well as the possibility of separately dimensioning and calibrating the two circuit portions.

By way of example, the second divider P2 may include first R3 and second R4 resistors, located between the supply voltage Vbus and the ground. The first resistor R3 may have, for instance, a value of about 1 MΩ, and the second resistor R4 may have, for instance, a value of about 30 KΩ.

Then, the main signal SW is compared with a preset reference Vref and, according to this comparison, the regulating module 40 generates a regulating signal S3 to influence the operation of the control module 30.

According to such regulating signal S3, the control module 30 modifies the pulse current S1.

Particularly, upon operation of the regulating module 40, the processing unit PFC modifies the above mentioned control signal S2 to appropriately control the switching device M1.

Preferably, the regulating signal S3 acts upon a first reading branch B1 for reading the current sense signal VS, i.e., on a branch through which the current sense signal VS is transferred to the processing unit PFC. In other words, the regulating signal S3 modifies sensing of the current sense signal VS by the processing unit PFC, i.e., causes the processing unit PFC to sense a modified current sense signal VS' which is different from the current sense signal VS. Thus, the regulating signal S3 can influence the operation of the processing unit PFC and, as a result, the driving of the switching device M1, to adapt power factor control and THD reduction to different values of network voltage V1.

In practice, assume that the circuit 1 and particularly the sensing resistor RS are dimensioned to properly operate in response to a network voltage ranging from 230 VAC to 277 VAC.

Assuming a given power PX absorbed by the load L, a current flows in the sensing resistor RS, which depends on PX and V1, and generates the current sense signal VS, i.e., a voltage drop on the sensing resistor RS.

The sensing resistor RS is dimensioned to generate a current sense signal VS having an optimized intensity for operation of the processing unit PFC.

If a much smaller network voltage V1 is applied to the same circuit 1, e.g., about 120 VAC, with the same power PX absorbed by the load L, the current that flows through the sensing resistor RS is much greater (as mentioned above, such current depends on PX and V1 and, in the latter case, the only parameter that has been changed is the network voltage V1, which now has a much smaller value). Therefore, there will be a much higher voltage drop on the sensing resistor RS, i.e., a current sense signal VS having a much higher intensity (or value) than the optimal case.

As a result, the processing unit PFC can no longer operate properly because, for instance, the circuit components of the processing unit PFC are forced to operate under conditions which are close to the limit, or even out, of their linearity range. Thus, the control signal S2 can no longer be generated accurately, and, turning back to FIG. 5, the circuit could no longer distribute current peaks to generate a substantially sinusoidal envelope.

In addition or as an alternative, the regulating signal S3 preferably acts upon a second reading branch B2 for reading the input signal VL, i.e., on a branch through which the input signal VL is transferred to the processing unit PFC. In other words, the regulating signal S3 modifies sensing of the current sense signal VL by the processing unit PFC, i.e., causes the processing unit PFC to sense a modified input signal VL' which is different from the input signal VL. Thus, the regulating signal S3 can influence the operation of the processing unit PFC and, as a result, the control of the switching device M1, to adapt power factor control and THD reduction to different values of network voltage V1.

More in detail, the regulating module 40 comprises a comparator circuit 40a.

For example, the comparator circuit 40a may include an operational amplifier, a pair of resistors R7, R8 and a capacitor C1.

The main signal SW is provided to a first input of the comparator circuit 40a.

Particularly, the main signal SM may be caused to flow through a resistor R6, thereby charging a capacitor C3, which is connected to an input terminal of the comparator circuit.

In a preferred embodiment, the main signal SW is provided to an inverting input 40a— of the comparator circuit 40a.

On the other hand, the above preset reference Vref is provided to a non-inverting input 40a+ of the comparator circuit 40a. This reference may be, for instance, about 5 V.

Preferably, the regulating module 40 further comprises a main switch M2, which is connected downstream from the comparator circuit 40a and is interlocked therewith.

Preferably, the main switch M2 may be formed as a transistor, such as a MOSFET, whose gate terminal is connected to the output terminal of the comparator circuit 40a.

According to the signals received at the input, i.e., the main signal SW and the preset reference Vref, the comparator circuit 40a drives the main switch M2.

For example:
If the voltage stored in the capacitor C3, representative of the main signal SW, is greater than the voltage that defines the preset reference Vref, then the comparator circuit 40a holds the main switch M2 off (in a cut-off state);
If the voltage stored in the capacitor C3, representative of the main signal SW, is smaller than the voltage that defines the preset reference Vref, then the comparator circuit 40a brings the main switch M2 into conduction, thereby causing a given current to flow through M2 and the resistor Rd, connected thereto in series.

In the cut-off state of the main switch M2, in which the regulating signal S3 substantially assumes a "low" logic state, the current sense signal VS is sensed by the processing unit PFC without being modified.

If there is a connection between the regulating module 40 and the second reading branch B2, the auxiliary switch M3 is brought into conduction to modify, particularly reduce the input signal VL, such that the processing unit PFC receives the modified input signal VL'. In practice, by bringing the auxiliary switch M3 into conduction, the resistor R5 is virtually added in parallel to the resistor R2 of the first divider P1, thereby providing a different division rate and a different voltage on the second branch B2.

In the conduction state of the main switch M2, in which the regulating signal S3 substantially assumes a "high" logic state, the current sense signal VS is modified, whereby a modified current sense signal VS', having a smaller amplitude than the current sense signal Vs, is provided by the divider consisting of the resistors Ra, Rb.

If there is a connection between the regulating module 40 and the second reading branch B2, the auxiliary switch M3 is not brought into conduction, and the unmodified input signal VL is sensed by the processing unit PFC.

Figure 3:
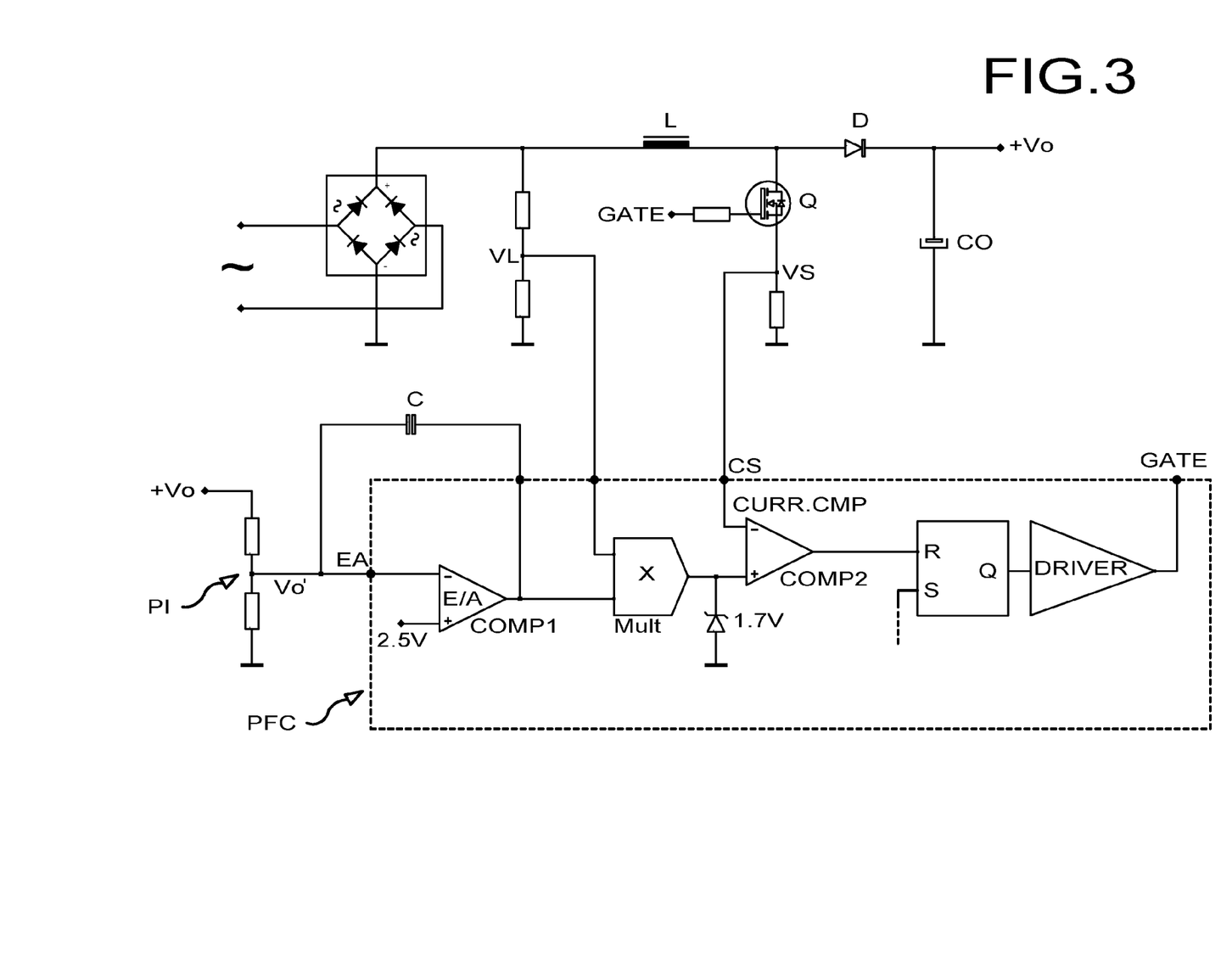
FIG. 3 is a schematic view of a detail of the circuit of FIG. 1, relevant for the present invention.

FIG. 3 schematically shows an exemplary embodiment of a known PFC processing unit, which may be conveniently also applied to the circuit 1 (FIG. 4) of the present invention. Such unit comprises an input divider PI through which a voltage Vo' is drawn, which is defined as a given fraction of the output voltage Vo; a first comparator Comp1, for comparing such voltage Vo' with a preset reference; a multiplier Mult, which performs a multiplication of the output of the first operational-amplifier comparator Comp1 by the input signal VL.

The output of the multiplier Mult is compared, by a second comparator Comp2, with the current sense signal VS. Then, the output of the second comparator Comp2 causes the driving of the switching device M1.

The convenient and controlled modification of the input signal VL and/or the current sense signal VS afforded by the present invention can ensure that the multiplier Mutt and the second comparator Comp2 operate in their respective linearity ranges even with different network voltages V1.

Figure 6A:
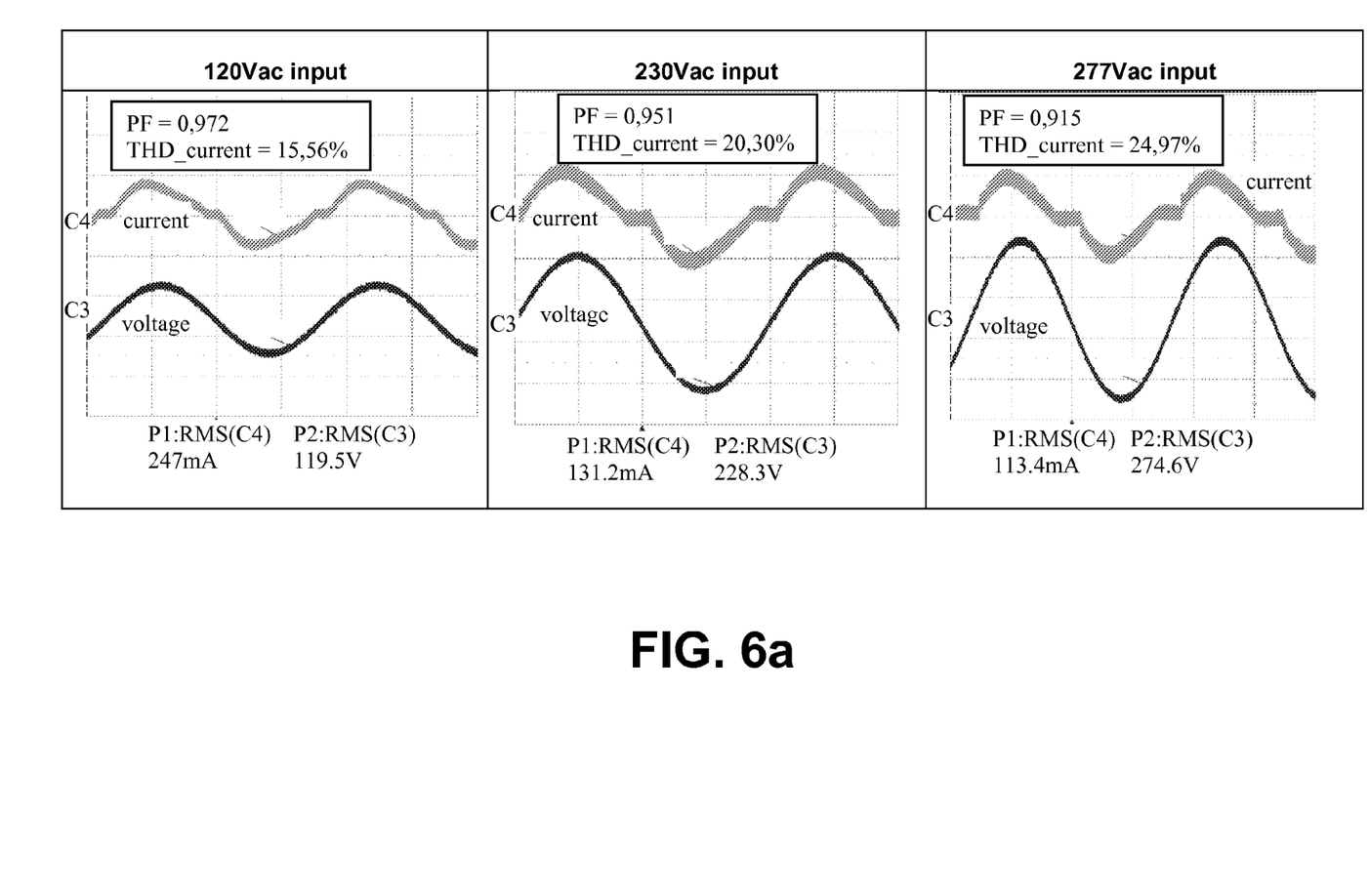
FIGS. 6*a*-6*b* show a comparison between the performances of prior art circuits and the results obtained with the circuit of FIG. 4.
Figure 6B:
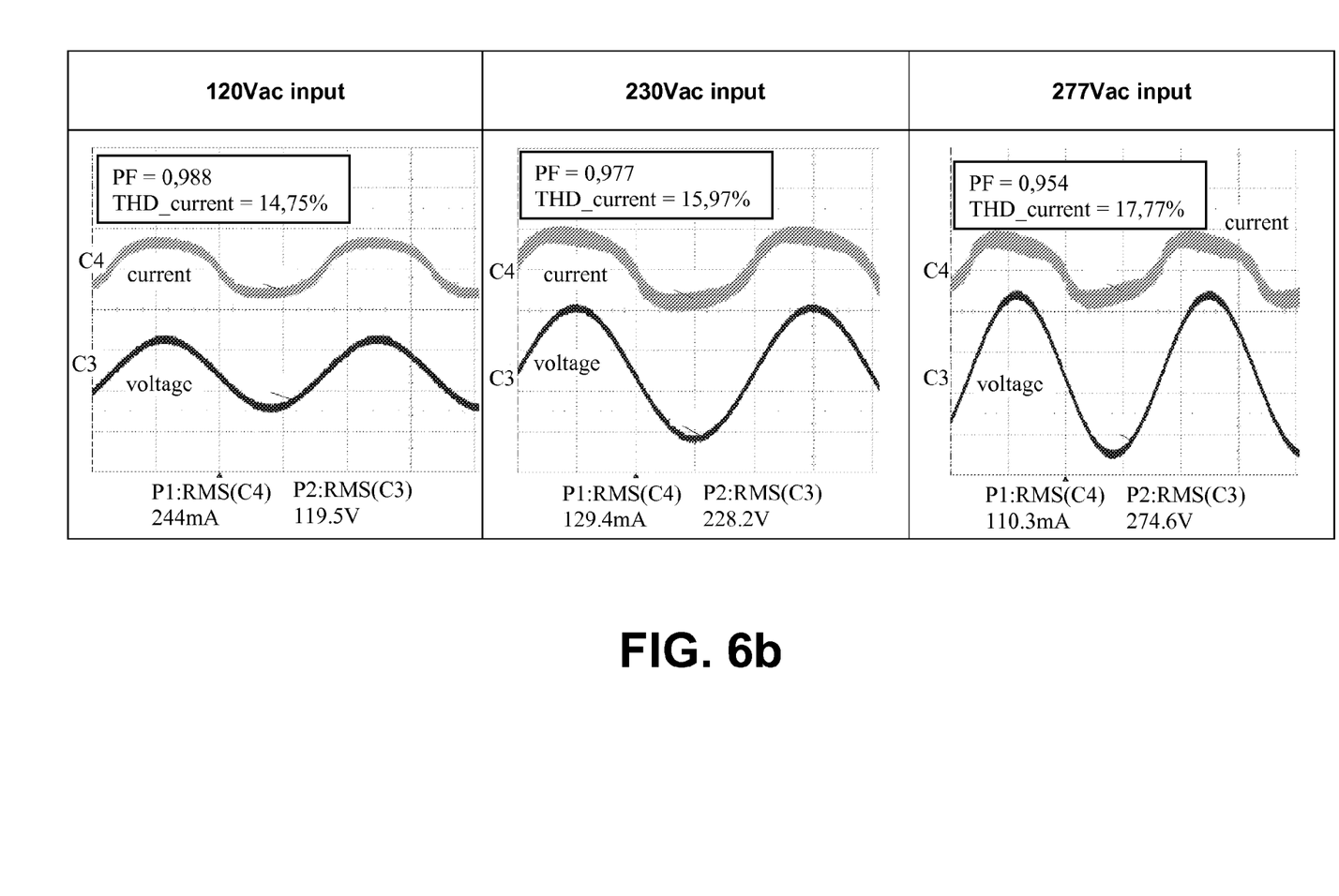

FIGS. 6a, 6b schematically show a comparison between the behavior of the prior art (FIG. 6a) and the results obtained by the circuit 1 of the invention (FIG. 6b): these show that the waveform of the current reconstructed by the circuit 1 is much closer to a sine waveform, which affords an increase of the power factor and a reduction of undesired harmonics.

The present description relates to the control circuit 1, which has the same structure as the circuit diagram of FIG. 2 (bulkless flyback circuit)—excepting the regulating module 40 and the circuit elements associated therewith. Nevertheless, the invention may similarly applied to circuits as shown in FIG. 1 (Transition Mode Boost PWM circuits).

The invention affords remarkable advantages.

Firstly, the circuit of the invention can supply power to an electric load while maintaining a high power factor value and a low total harmonic distortion value, over a wide range of possible input supply voltages.

Furthermore, the circuit of the invention has a simple structure and low manufacturing costs.

The invention claimed is:

1. A control circuit for reducing Total Harmonic Distortion (THD) in the power supply to an electric load, comprising:
   a. An input stage for receiving a network voltage and providing a corresponding rectified sinusoidal output supply voltage;
   b. An output stage associated with said input stage for providing power supply to an electric load;
   c. A control module configured to control the power factor and the harmonic distortion (THD) of the energy obtained from said network voltage, by regulating a pulse current that acts upon the power supply absorbed by said output stage;
   d. A regulating module configured for:
      Sensing a main signal representative of said supply voltage;
      Comparing said main signal with a preset reference;
      Generating a regulating signal designed for said control module wherein said control module is configured to modify the pulse current according to said regulating signal;
   wherein said control module comprises a processing unit, which is designed to receive an input signal representative of said supply voltage, to receive as an input, through a first reading branch, a current sense signal representative of said pulse current and to control said pulse current according to said input signal and said current sense signal;
   wherein said regulating module is configured to:
      determine whether said main signal is representative of whether said supply voltage is below a given threshold or not;
      if it is not, allow said processing unit to receive said current sense signal through said first reading branch;
      if it is, generate said regulating signal to act upon said first reading branch, such that said processing unit receives, through said first reading branch, a modified current sense signal whose value is smaller than said current sense signal.

2. A circuit as claimed in claim 1, wherein said electric load is a lighting device, particularly a LED device.

3. A circuit as claimed in claim 2, wherein said regulating signal acts upon a second reading branch for reading said input signal.

4. A circuit as claimed in claim 1, wherein said regulating signal acts upon a second reading branch for reading said input signal.

5. A circuit as claimed in claim 4, wherein said regulating module is configured to:
   determine whether said main signal is representative of whether said supply voltage is below a given threshold or not;
   if it is, allow said processing unit to receive said input signal through said second reading branch;
   if it is not, generate said regulating signal to act upon said second reading branch, such that said processing unit receives, through said second reading branch a modified input signal whose value is smaller than said input signal.

6. A circuit as claimed in claim 1, wherein said input signal is generated by said supply voltage through a first divider and said main signal is generated by said supply voltage through a second divider different than said first divider.

* * * * *